(12) United States Patent
Maeda et al.

(10) Patent No.: US 8,011,231 B2
(45) Date of Patent: Sep. 6, 2011

(54) CONTROL APPARATUS FOR INTERNAL COMBUSTION ENGINE

(75) Inventors: Osamu Maeda, Chiyoda-ku (JP); Hideki Takubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 12/357,855

(22) Filed: Jan. 22, 2009

(65) Prior Publication Data

US 2009/0260419 A1 Oct. 22, 2009

(30) Foreign Application Priority Data

Apr. 18, 2008 (JP) ................................. 2008-108814

(51) Int. Cl.
   *G01M 15/04* (2006.01)
(52) U.S. Cl. ..................................... 73/114.45; 73/23.32
(58) Field of Classification Search .................. 73/23.32, 73/114.45, 114.52
   See application file for complete search history.

(56) References Cited

U.S. PATENT DOCUMENTS

| | | | | |
|---|---|---|---|---|
| 4,957,087 A | * | 9/1990 | Ota | 123/479 |
| 4,967,714 A | * | 11/1990 | Inoue | 123/694 |
| 5,121,732 A | * | 6/1992 | Benninger et al. | 123/672 |
| 5,850,824 A | * | 12/1998 | Seitz et al. | 123/688 |
| 5,881,703 A | * | 3/1999 | Nankee et al. | 123/686 |
| 6,016,796 A | | 1/2000 | Dalton | |
| 6,389,874 B1 | * | 5/2002 | Huff et al. | 73/1.02 |
| 6,644,285 B2 | * | 11/2003 | Bayerle et al. | 123/491 |
| 6,714,856 B2 | * | 3/2004 | Huff et al. | 701/114 |
| 6,758,201 B2 | * | 7/2004 | Hosoi | 123/679 |
| 6,928,998 B2 | * | 8/2005 | Abe | 123/674 |
| 7,209,826 B2 | * | 4/2007 | Abe et al. | 701/109 |
| 2003/0070666 A1 | * | 4/2003 | Hosoi | 123/672 |
| 2009/0314071 A1 | * | 12/2009 | Mukai | 73/114.38 |
| 2010/0242935 A1 | * | 9/2010 | Takubo | 123/703 |

FOREIGN PATENT DOCUMENTS

| | | |
|---|---|---|
| JP | 07-009201 B2 | 2/1995 |
| JP | 2003-120363 A | 4/2003 |
| JP | 2008-038785 A | 2/2008 |
| JP | 2008-064078 A | 3/2008 |

* cited by examiner

*Primary Examiner* — Freddie Kirkland, III
(74) *Attorney, Agent, or Firm* — Sughrue Mion, PLLC (57) ABSTRACT

The control apparatus for the internal combustion engine includes: a unit for detecting the change in the alcohol concentration of a fuel supplied to the internal combustion engine including a plurality of cylinders; a unit for detecting an air-fuel ratio variation between the plurality of cylinders; a unit for making the failure diagnosis when the air-fuel ratio variation between the plurality of cylinders exceeds a predetermined threshold value; and a unit for inhibiting the failure diagnosis executed based on the air-fuel ratio variation between the plurality of cylinders when the change in the alcohol concentration is detected.

2 Claims, 10 Drawing Sheets

CONTROL APPARATUS FOR INTERNAL COMBUSTION ENGINE

BACKGROUND OF THE INVENTION

1. Field of the Invention

The present invention relates to a control apparatus that uses an alcohol fuel to be supplied to an internal combustion engine.

2. Description of the Related Art

Recently, with air pollution, changes in the oil situation, and the like, alcohol has attracted attention as an alternate fuel, which is to be supplied to an internal combustion engine (hereinafter, referred to as an "engine"). For example, a flexible fuel vehicle (FFV) using a blend fuel of alcohol and gasoline (at an alcohol concentration of 0% to 100%) has been put into practical use. However, since a theoretical air-fuel ratio (weight ratio of air and a fuel necessary for complete combustion of the fuel) of alcohol differs depending on its concentration, the amount of the fuel according to the alcohol concentration must be injected.

In order to inject the amount of the fuel according to the alcohol concentration, a fuel injection amount obtained by a conventional computation is generally corrected with a correction amount according to the alcohol concentration. For example, when a level of the amount of the fuel in a fuel tank is varied by a predetermined value or larger, an error in the air-fuel ratio based on an output from an oxygen sensor provided to an exhaust pipe is detected. The alcohol concentration is estimated according to the detected error. Then, the fuel injection amount is corrected according to the estimated alcohol concentration (for example, see U.S. Pat. No. 6,016, 796).

On the other hand, in the engine provided with a plurality of cylinders, the oxygen sensor for detecting the air-fuel ratio of an exhaust gas is provided in an assembly portion of the exhaust pipes of the respective cylinders to detect an average air-fuel ratio of all the cylinders. Air-fuel ratio feedback control is performed to allow the average air-fuel ratio to be equal to a target air-fuel ratio.

However, the air-fuel ratio in each individual cylinder is not necessarily the target air-fuel ratio due to a variation in injection characteristics of an injector for supplying a fuel to each of the cylinders, time degradation caused by clogging of a nozzle hole of the injector, or the like. Thus, there is a variation in the air-fuel ratio between the cylinders, failing to supply an appropriate fuel injection amount to each of the cylinders in some cases. As a result, the combustion and the exhaust gas sometimes deteriorate. Therefore, the diagnosis of an injector failure, which is caused by the variation in the air-fuel ratio between the cylinders, is required.

For example, the number of times (number of inversions) at which an output value from the oxygen sensor provided in the assembly portion of the exhaust pipes, which is detected for each predetermined cycle, passes through a predetermined threshold value is counted. When the number of inversions within a predetermined period of time is equal to or larger than a predetermined number, it is determined that the output value from the oxygen sensor has a large pulsation (fluctuation), specifically, a variation occurs in the air-fuel ratio in a combustion stroke of each of the cylinders to make a diagnosis of the occurrence of a failure of the injector (for example, see Japanese Examined Patent Publication No. H07-009201).

The variation in the air-fuel ratio between the cylinders also occurs when a fuel having characteristics (volatility, theoretical air-fuel ratio, or the like) which are different from those of the currently used fuel is fed. For example, the variation in the air-fuel ratio occurs in the following case and the like. A returnless system including no flow path from the fuel pump to four injectors, through which the fuel returns to the fuel tank, is used as a fuel supply system. The fuel is switched from gasoline at the alcohol concentration of 0% (E0) to the alcohol fuel at the alcohol concentration of 100% (E100) to be fed.

Since the gasoline still remains in the fuel pipe and a delivery pipe immediately after the alcohol fuel is fed, the gasoline is supplied to the injector of each of the cylinders immediately after engine start. Then, with the consumption of the remaining gasoline for an engine operation, the alcohol fuel moves in the fuel pipe. As a result, the alcohol fuel reaches the delivery pipe. Here, since a sectional area of the delivery pipe is larger than that of the fuel pipe, the gasoline and the alcohol fuel mix with each other in the delivery pipe to be distributed to the injectors. Therefore, with the consumption of the fuel, the fuel changes from the fuel at a low alcohol concentration close to that of the gasoline at the beginning to the fuel at a high alcohol concentration close to that of the alcohol fuel. Finally, only the alcohol fuel reaches the injectors. However, since the concentration starts changing from the inlet side of the delivery pipe because of a shape of the delivery pipe, the fuel at the same concentration cannot be supplied to all the injectors at the same timing. Specifically, although the alcohol concentration starts changing at an early point in time in the cylinder close to the inlet of the delivery pipe, the alcohol concentration starts changing at the latest point in time in the cylinder on the remote side of the delivery pipe.

Since the variation occurs in the timing of occurrence of the change in the concentration of alcohol supplied to the injectors, a variation also occurs in the air-fuel ratio between the cylinders. An alcohol concentration value used in the control is generally detected by the oxygen sensor provided in the assembly portion of the exhaust pipes of the respective cylinders or an alcohol concentration sensor provided to the fuel pipe. Further, the fuel injection amount is corrected according to the detected alcohol concentration. However, a difference in the change in the alcohol concentration in the injector between the cylinders cannot be detected. As the (estimated) alcohol concentration value, an average alcohol concentration of the first to fourth cylinders is detected. As a result of the fuel injection amount control using the average alcohol concentration value, the fuel injection amount becomes lean in the fourth and third cylinders with respect to the target air-fuel ratio, whereas the fuel injection amount becomes rich in the first and second cylinders with respect to the air-fuel ratio. As a result, the variation temporarily occurs in the air-fuel ratio between the cylinders.

Moreover, since a fluctuation in the oxygen sensor output becomes large due to the variation in the air-fuel ratio between the cylinders, the air-fuel ratio control (fuel injection amount control) cannot be accurately controlled by using the output value from the oxygen sensor, resulting in the deterioration of the combustion and the exhaust gas of each of the cylinders.

Further, according to the conventional methods, an accurate failure diagnosis can be made for a lasting variation such as the variation in injection characteristics between the injectors or the time degradation due to the clogging of the nozzle hole of the injector in the diagnosis of the failure of the injector based on the variation in the air-fuel ratio between the cylinders. However, the temporary variation in the air-fuel ratio occurring when the alcohol concentration changes is not assumed. Therefore, as a result of the detection of the fluctuation in the oxygen sensor output value when the alcohol concentration changes, there is a fear that a wrong diagnosis of the occurrence of the failure may be made although the injector is normal. Thus, there is a problem that the combustion and the exhaust gas are deteriorated.

SUMMARY OF THE INVENTION

An object of the present invention is to provide a control apparatus for an internal combustion engine, which is capable of excluding a temporary increase in a variation in an air-fuel ratio between cylinders due to a change in an alcohol concentration from judgment of a failure to improve accuracy of a failure diagnosis of a steady variation in the air-fuel ratio between the cylinders due to time degradation or the like.

A control apparatus for an internal combustion engine according to the embodiment includes: means for detecting a change in an alcohol concentration of a fuel supplied to the internal combustion engine including a plurality of cylinders; means for detecting an air-fuel ratio variation between the plurality of cylinders; means for making a failure diagnosis when the air-fuel ratio variation between the plurality of cylinders exceeds a predetermined threshold value; and means for inhibiting the failure diagnosis executed based on the air-fuel ratio variation between the plurality of cylinders when the change in the alcohol concentration is detected.

The control apparatus for the internal combustion engine according to the present invention has the effects that the failure diagnosis based on the detection of the variation in the air-fuel ratio between the cylinders is inhibited when the change in the alcohol concentration is detected, to enable the exclusion of the temporary increase in the variation in the air-fuel ratio between the cylinders, which is caused by the change in the alcohol concentration, from the diagnosis of occurrence of the failure to improve the accuracy of the failure diagnosis of the steady variation in the air-fuel ratio between the cylinders due to the time degradation or the like.

DETAILED DESCRIPTION OF THE PREFERRED EMBODIMENTS

First Embodiment

Figure 1:
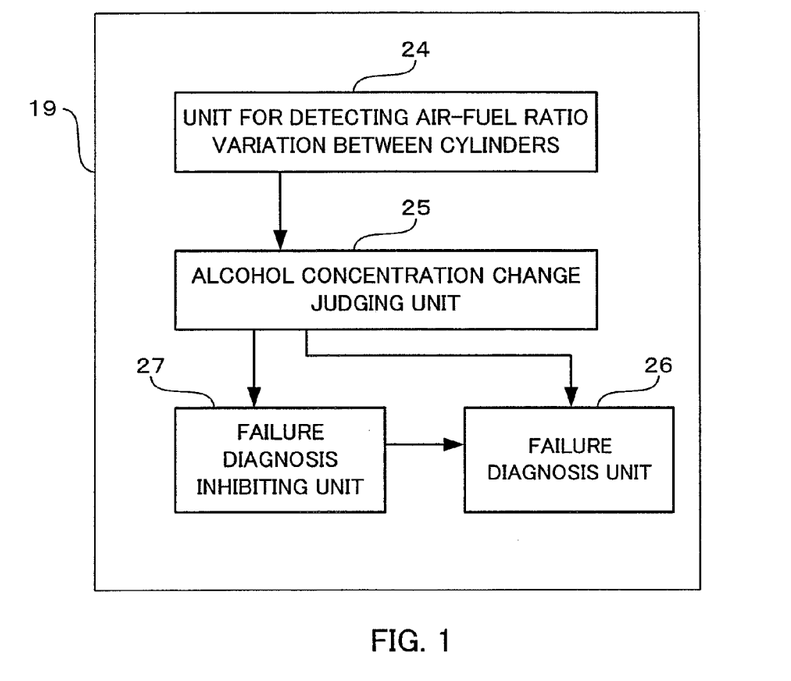
FIG. 1 is a block diagram illustrating functions of a control apparatus for an internal combustion engine according to a first embodiment of the present invention.
Figure 2:
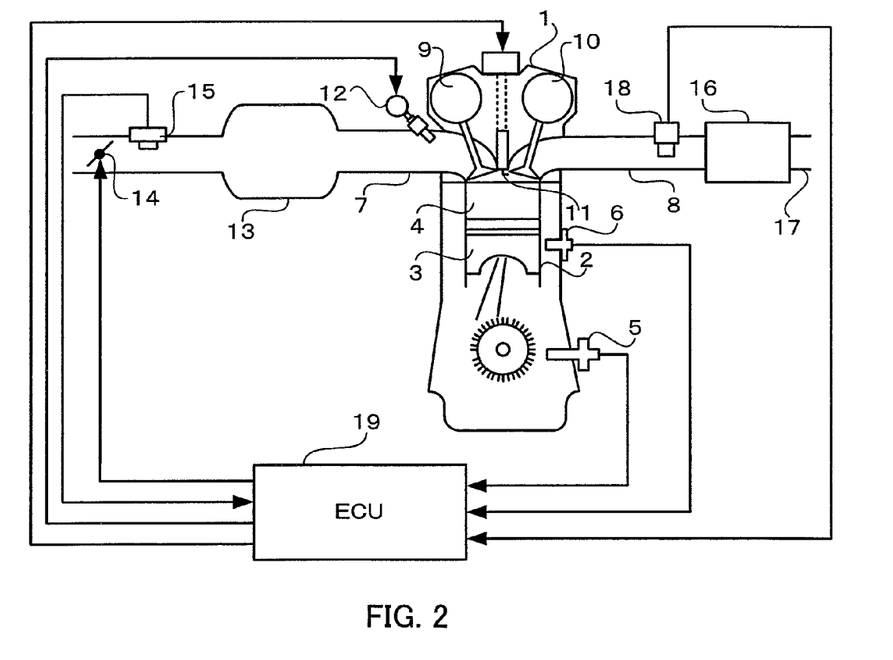
FIG. 2 is a configuration diagram illustrating an entire system of the internal combustion engine according to the first embodiment of the present invention.
Figure 3:
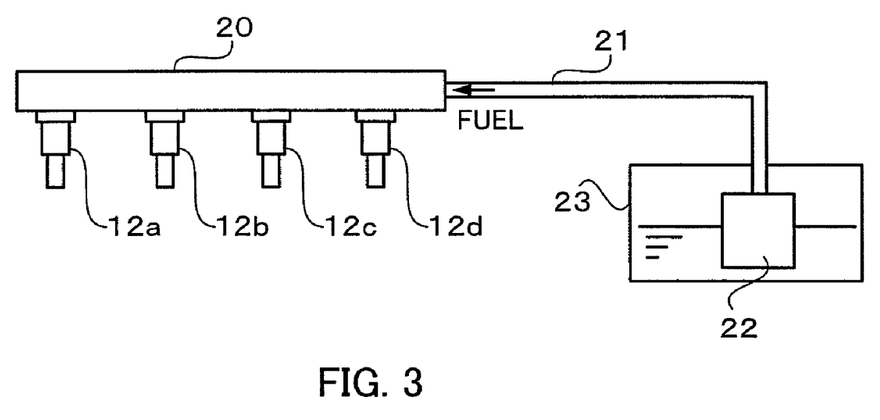
FIG. 3 is a configuration diagram illustrating a fuel flow path of the internal combustion engine according to the first embodiment of the present invention.

FIG. 1 is a block diagram illustrating functions of a control apparatus for an internal combustion engine according to a first embodiment of the present invention. FIG. 2 is a configuration diagram illustrating an entire system including the control apparatus for the internal combustion engine according to the first embodiment of the present invention. FIG. 3 is a configuration diagram illustrating a fuel flow path according to the first embodiment of the present invention. The internal combustion engine is generally provided with a plurality of cylinders. The internal combustion engine according to the first embodiment of the present invention is an in-line four cylinder internal combustion engine. In FIG. 2, one of the cylinders is illustrated.

An internal combustion engine (hereinafter, referred to as an "engine") 1 according to the first embodiment of the present invention includes a cylinder 2 having a cylindrical shape and a piston 3 reciprocating in the cylinder 2. A combustion chamber 4, in which a mixture of a fuel and air is sucked to be combusted, is formed by the cylinder 2 and the piston 3.

Here, the piston 3 is provided to be able to reciprocatably move in an axial direction of the cylinder 2. A crank angle sensor 5 separate away from a crank shaft, which generates a signal in synchronization with the rotation of the engine 1, is provided to the cylinder 2. A water temperature sensor 6 for outputting a voltage according to a temperature of cooling water (not shown) for cooling the engine 1 is provided to the cylinder 2.

Moreover, an intake manifold 7 for sucking the air into the combustion chamber 4 and an exhaust manifold 8 for exhausting an exhaust gas generated by the combustion of the mixture in the combustion chamber 4 are connected to the cylinder 2.

An intake valve 9 which opens/closes between the combustion chamber 4 and the intake manifold 7 and an exhaust valve 10 which opens/closes between the combustion chamber 4 and the exhaust manifold 8 are attached to the cylinder 2.

Moreover, an ignition plug 11 for igniting the mixture supplied to the combustion chamber 4 is attached at the top of the cylinder 2.

On the downstream side of the intake manifold 7 and in the vicinity of the intake valve 9, an injector 12 for injecting the fuel is attached. The injector 12 allows the fuel to be supplied to the combustion chamber 4 at optimal timing.

On the upstream side of the intake manifold 7, a surge tank 13 for temporarily storing the air sucked into the combustion chamber 4 is connected. Further, on the upstream side of the surge tank 13, a throttle valve 14 is connected. Further, a boost pressure sensor 15 for outputting a voltage according to a boost pressure is provided between the throttle valve 14 and the surge tank 13.

On the downstream side of the exhaust manifold 8, a catalytic device 16 for removing a noxious substance in the exhaust gas is connected. Further, on the downstream side of the catalytic device 16, a tail pipe 17 for exhausting the exhaust gas to the outside is connected.

Moreover, an oxygen sensor 18 whose output voltage drastically changes at a theoretical air-fuel ratio in response to a change in an air-fuel ratio of the exhaust gas is provided to the exhaust manifold 8.

Next, a fuel flow path in the engine 1 of the present invention is described referring to FIG. 3. The fuel passes from a fuel tank 23 by a fuel pump 22 through a fuel pipe 21 to be supplied to injectors 12a to 12d of the respective cylinders by a delivery pipe 20. A first injector 12a, a second injector 12b, a third injector 12c, and a fourth injector 12d are arranged in this order from the remote side along the flow of the fuel in the delivery pipe 20 to the near side. Cylinder numbers of the first to fourth injectors 12a to 12d respectively correspond to first to fourth cylinders.

An electronic control unit for engine control (hereinafter, abbreviated as an "ECU") 19 includes a microcomputer (not shown) including a CPU for performing computational processing, a ROM for storing an instruction or fixed value data constituting a program, a RAM for updating stored data to be sequentially rewritten, and a backup RAM for retaining stored data even when the ECU 19 is powered OFF, a drive circuit (not shown) for driving an actuator, and an I/O interface (not shown) for performing input/output of various signals.

A program is stored in the ROM of the ECU 19. The CPU reads out the program stored in the ROM to execute a computation according to the instruction of the program. As a result, an alcohol concentration change judging unit 25, a unit 24 for detecting an air-fuel ratio variation between the cylinders, a failure diagnosis unit 26, and a failure diagnosis inhibiting unit 27 function in the ECU 19.

Moreover, voltage output values from the oxygen sensor 18, the water temperature sensor 6, and the boost pressure sensor 15 are subjected to A/D conversion to be input to the ECU 19. The voltage output values, which are subjected to the A/D conversion, are used for the computation in each of the units respectively as an oxygen sensor output value $\lambda O2$, a cooling water temperature Tw, and a boost pressure Pb.

Moreover, an interrupt input of the signal from the crank angle sensor 5 is performed to the ECU 19. An engine rpm Ne is computed from a built-in timer in the ECU 19 and the signal from the crank angle sensor 5.

The alcohol concentration change judging unit 25 detects an error in the fuel-air ratio from the oxygen sensor output value $\lambda O2$ output by the oxygen sensor 18 provided in the assembly portion of the exhaust pipes. The alcohol concentration change judging unit 25 computes an estimated alcohol concentration value A1 according to the detected error, compares the estimated alcohol concentration value A1 obtained by the current computation and the estimated alcohol concentration value A1 obtained by the previous computation with each other, and judges the occurrence of a change in the alcohol concentration when the amount of change obtained by the comparison is larger than a preset value. As the preset value, a value allowable as an alcohol concentration change error is set.

The unit 24 for detecting the air-fuel ratio variation between the cylinders detects a variation in the air-fuel ratio between the cylinders based on an integrated value of the amount of fluctuation in the oxygen sensor output value $\lambda O2$ output by the oxygen sensor 18 in a combustion stroke cycle of each of the cylinders, which is obtained from the oxygen sensor output value $\lambda O2$ output by the oxygen sensor 18 provided in the assembly portion of the exhaust pipes.

The failure diagnosis unit 26 determines that abnormality or a failure occurs in the injectors 12a to 12d when the air-fuel ratio variation between the cylinders detected by the unit 24 for detecting the air-fuel ratio variation between the cylinders is large and the alcohol concentration change judging unit 25 judges that there is no change in the alcohol concentration.

The failure diagnosis inhibiting unit 27 inhibits the execution of the failure diagnosis unit 26 when the air-fuel ratio variation between the cylinders detected by the unit 24 for detecting the air-fuel ratio variation between the cylinders is large and the alcohol concentration change judging unit 25 judges that there is a change in the alcohol concentration, that is, the estimated alcohol concentration value A1 is increased/decreased by a predetermined value.

Figure 4:
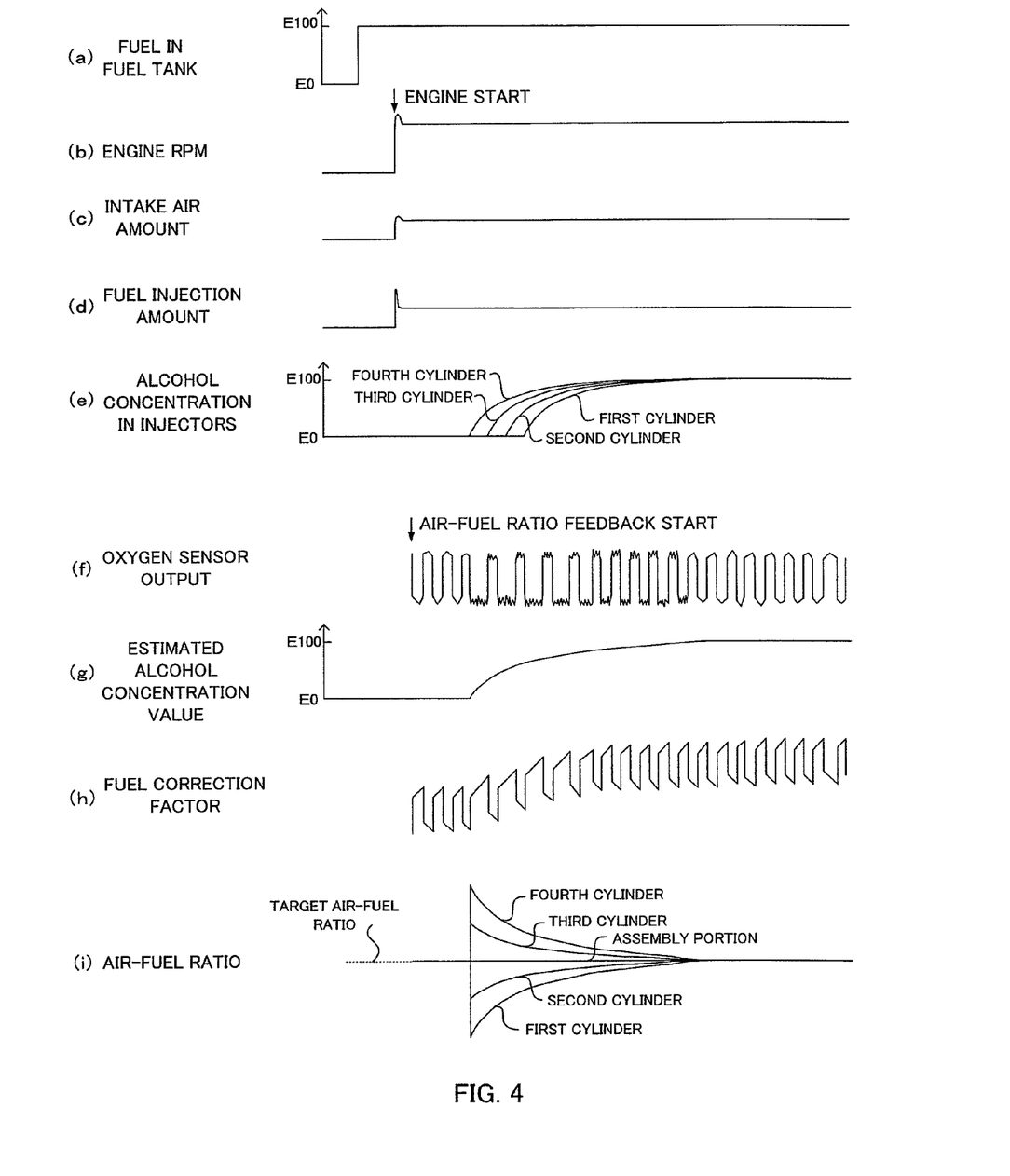
FIG. 4 is a view illustrating a behavior of the internal combustion engine when a fuel is switched from gasoline to an alcohol fuel in the internal combustion engine according to the first embodiment of the present invention.

FIG. 4 is a view illustrating changes in a state of the engine 1 when an alcohol fuel (E100) at an alcohol concentration of 100% is fed as the fuel in place of gasoline (E0).

The variation in the air-fuel ratio between the cylinders occurs as follows. When the fuel is switched from the gasoline (E0) to the alcohol fuel (E100) to be fed, the gasoline (E0) is fed to the injectors 12a to 12d of the respective cylinders immediately after the engine is started because the gasoline (E0) still remains in the fuel pipe 21 and the delivery pipe 20 immediately after the alcohol fuel (E100) is fed. With the consumption of the remaining gasoline (E0) for an engine operation, the alcohol fuel (E100) moves in the fuel pipe 21 to allow the alcohol fuel (E100) to reach the delivery pipe 20.

Here, since a sectional area of the delivery pipe 20 is larger than that of the fuel pipe 21, the gasoline (E0) and the alcohol fuel (E100) are mixed with each other in the delivery pipe 20 to be distributed to the injectors 12a to 12d. With the consumption of the fuel, the alcohol concentration changes from a low one close to the alcohol concentration of the gasoline (E0) at the beginning to a high one close to the alcohol concentration of the alcohol fuel (E100). Finally, only the alcohol fuel (E100) reaches the injectors 12a to 12d.

However, since the concentration starts changing from the inlet side of the delivery pipe 20 because of a shape of the delivery pipe 20, the fuel of the same concentration cannot be supplied to all the injectors 12a to 12d at the same timing. Specifically, although the alcohol concentration starts changing at an early point of time in the injector 12d close to the inlet of the delivery pipe 20, the start of the change in the alcohol concentration is the latest in the injector 12a on the remote side of the delivery pipe 20.

The occurrence of the variation in the timing of the change in the alcohol concentration of the fuel supplied to the injectors 12a to 12d induces a variation in the air-fuel ratio between the cylinders.

Thus, it is wrong to make the diagnosis of the failure of the injectors 12a to 12d based on the variation in the air-fuel ratio between the cylinders.

Figure 5:
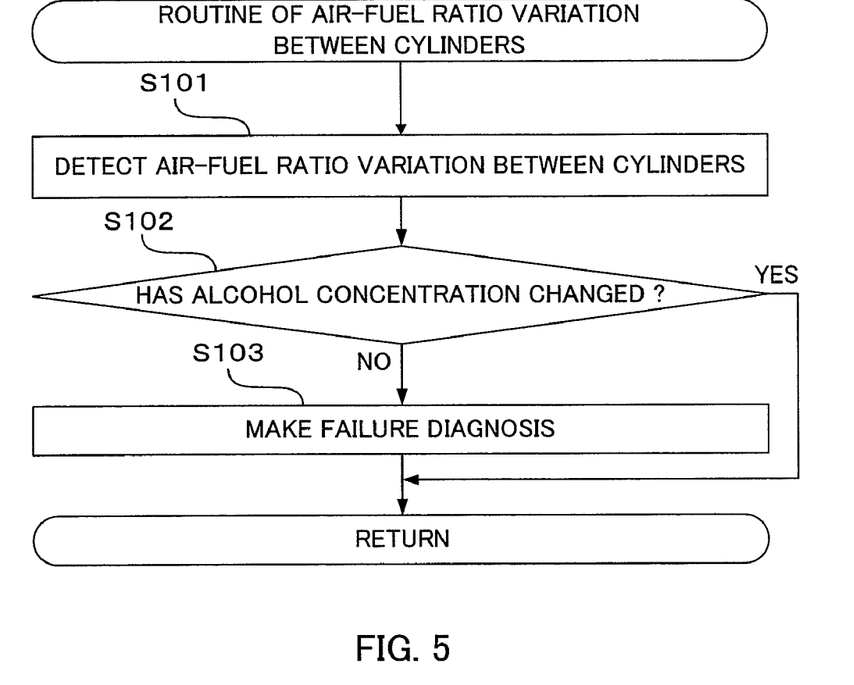
FIG. 5 is a flowchart illustrating a procedure of a routine of an air-fuel ratio variation between cylinders, which is executed in an ECU according to the first embodiment of the present invention.

Next, an operation of executing/inhibiting the failure diagnosis upon detection of the air-fuel ratio variation between the cylinders in the control apparatus for the engine 1 according to the first embodiment of the present invention is described referring to a flowchart of FIG. 5. The operation is executed during the execution of a main routine in a predetermined time cycle in the ECU 19.

First, in S101, the air-fuel ratio variation between the cylinders is detected.

In S102, it is judged whether or not the alcohol concentration has changed. Specifically, when a difference between the current estimated alcohol concentration value A1 and the previous estimated alcohol concentration value A1 is equal to or larger than a preset threshold value, it is judged that each air-fuel ratio is varied between the cylinders by the occurrence of the change in the alcohol concentration to terminate the routine of the air-fuel ratio variation between the cylinders. When the difference is less than the threshold value, the processing proceeds to S103.

In S103, it is judged that there is a possibility of occurrence of a real failure because the alcohol concentration has not changed. Therefore, the failure diagnosis is executed. Specifically, when the air-fuel ratio variation between the cylinders, which is detected in S101, is large, the diagnosis of the occurrence of the failure is made. When the air-fuel ratio variation between the cylinders is small, the diagnosis of normality is made.

According to the control apparatus for the engine 1 according to the first embodiment of the present invention, when it is judged that the alcohol concentration has changed, the failure diagnosis based on the detection of the air-fuel ratio variation between the cylinders is inhibited. As a result, a temporary increase in the air-fuel ratio variation between the cylinders due to the change in the alcohol concentration can be excluded from the failure diagnosis. Accordingly, the accuracy of the failure diagnosis based on a steady air-fuel ratio variation between the cylinders due to time degradation or the like can be improved.

In the control apparatus for the engine 1 according to the first embodiment of the present invention, the estimated alcohol concentration value is computed from the oxygen sensor output value $\lambda O2$ output by the oxygen sensor 18. Then, the change in the alcohol concentration is detected based on the currently and previously computed estimated alcohol concentration values. However, the detection of the change in the alcohol concentration is not limited thereto. For example, the change in the alcohol concentration may be detected when the fuel is supplied to the fuel tank 23 to cause a change in fuel level.

Moreover, although the air-fuel ratio variation between the cylinders is detected based on the fluctuation in the oxygen sensor output value $\lambda O2$, the detection of the air-fuel ratio variation between the cylinders is not limited thereto. Air-fuel ratio information such as an air-fuel ratio feedback control value may also be used.

Moreover, although the air-fuel ratio variation between the cylinders is detected based on the oxygen sensor output value $\lambda O2$, the detection of the air-fuel ratio variation between the cylinders is not limited thereto. For example, the air-fuel ratio variation between the cylinders may be detected based on a sensor output such as a fluctuation in rpm, a linear air-fuel ratio sensor signal, a knock sensor signal, a cylinder internal pressure sensor signal, an ion current sensor signal or an exhaust gas component concentration sensor signal.

Second Embodiment

Figure 6:
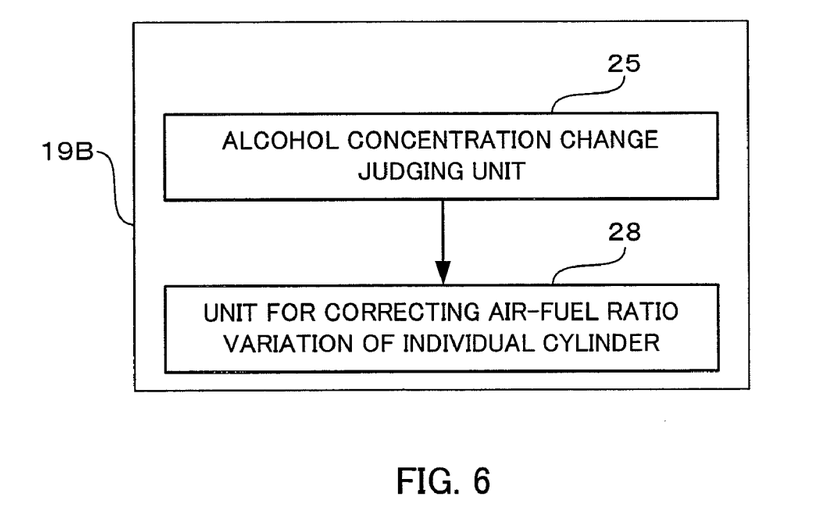
FIG. 6 is a block diagram illustrating functions of a control apparatus for an internal combustion engine according to a second embodiment of the present invention.

FIG. 6 is a block diagram illustrating the functions of the control apparatus for the internal combustion engine according to a second embodiment of the present invention.

In the control apparatus for the internal combustion engine according to the second embodiment of the present invention, a fuel injection amount is corrected with a correction amount for each cylinder to absorb the air-fuel ratio variation between the cylinders occurring when the alcohol concentration changes. Since configuration diagrams illustrating the entire system including the control apparatus for the internal combustion engine and the fuel flow path according to the second embodiment of the present invention are the same as the configuration diagrams of FIGS. 2 and 3, the description thereof is herein omitted.

The program is stored in the ROM of an ECU 19B according to the second embodiment of the present invention. The CPU reads out the program stored in the ROM to execute the computation according to the instruction of the program. As a result, the alcohol concentration change judging unit 25 and a unit 28 for correcting the air-fuel ratio variation of individual cylinder function in the ECU 19B. The alcohol concentration change judging unit 25 is the same as that described in the first embodiment.

When the change in the alcohol concentration is detected by the alcohol concentration change judging unit 25, a correction value obtained by multiplying the amount of change in the alcohol concentration value by a factor for each cylinder is computed. With the obtained correction value, the unit 28 for correcting the air-fuel ratio variation of individual cylinder corrects the fuel injection amount. As the factor for each cylinder, a positive value is preset for the cylinder close to the fuel inlet of the delivery pipe 20, whereas a negative value is preset for the cylinder away from the fuel inlet of the delivery pipe 20 in consideration of the shape of the delivery pipe 20 for distributing the fuel to the injectors 12a to 12d.

For the fuel injection amount, a basic fuel injection amount Tb is computed based on the boost pressure Pb and the engine rpm Ne. Then, the basic fuel injection amount Tb is subjected to a correction by the unit 28 for correcting the air-fuel ratio variation of individual cylinder and other corrections, for example, a water temperature correction and an air-fuel ratio feedback control correction. Further, a value obtained by further adding a dead time Td of the injectors 12a to 12d to the corrected basic fuel injection amount is obtained as a final fuel injection amount. The amount of fuel in proportion to the fuel injection amount is injected from each of the injectors 12a to 12d.

Figure 7:
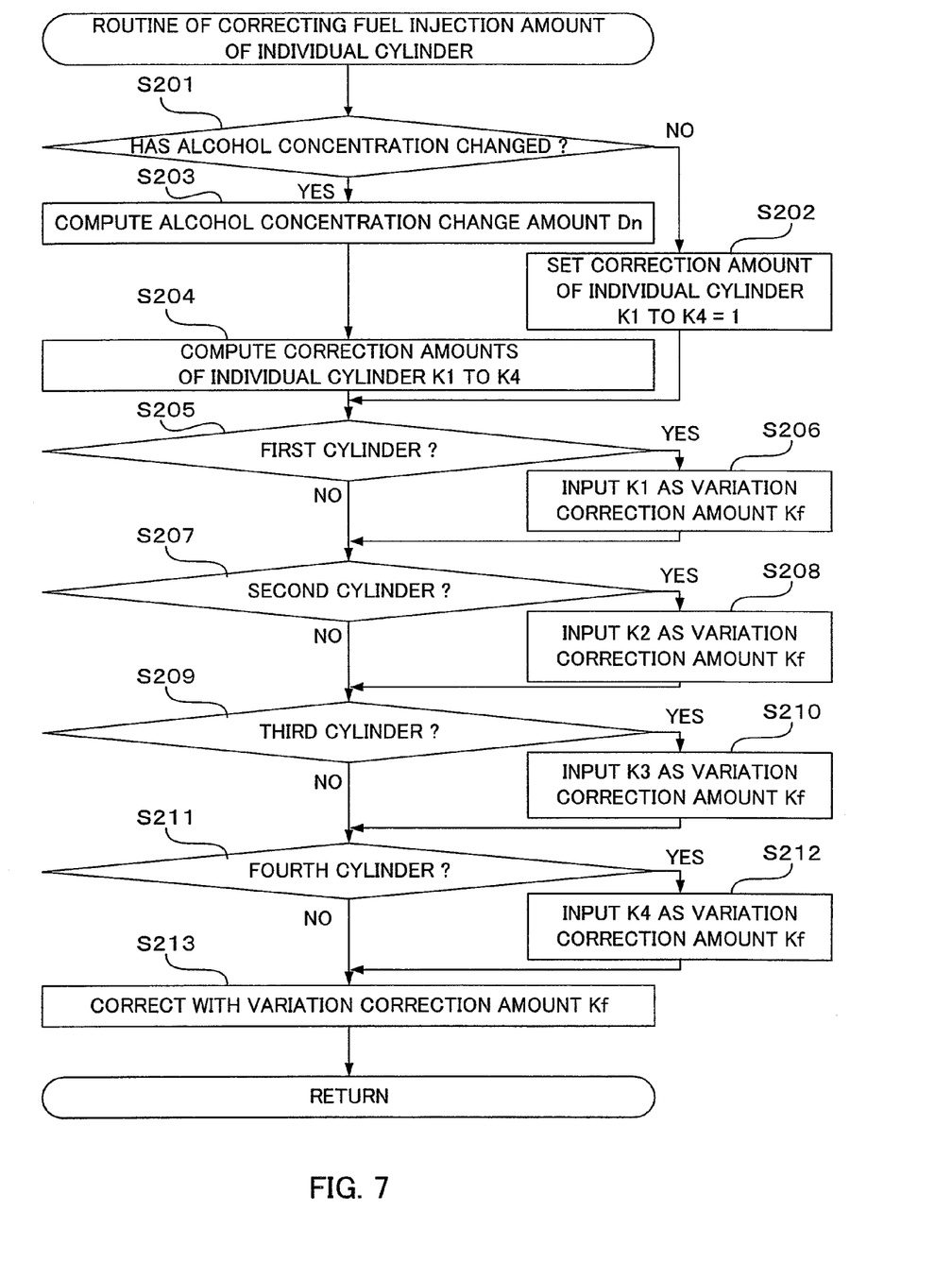
FIG. 7 is a flowchart illustrating a procedure of a routine of correcting a fuel injection amount of individual cylinder, which is executed in an ECU according to the second embodiment of the present invention.

Next, an operation of correcting the fuel injection amount of individual cylinder in the control apparatus for the internal combustion engine according to the second embodiment of the present invention is described referring to a flowchart of FIG. 7. The operation is executed as a sub-routine during the execution of a main routine in a predetermined time cycle in the ECU 19B.

First, in S201, it is judged whether or not the alcohol concentration has changed. When the alcohol concentration has not changed, the processing proceeds to S202. When the alcohol concentration has changed, the processing proceeds to S203. Specifically, when the difference between the current estimated alcohol concentration value A1 and the previous estimated alcohol concentration value A1 is larger than the preset threshold value, it is judged that the alcohol concentration has changed.

In S202, correction amounts of individual cylinder K1 to K4 are all set to 1. Then, the processing proceeds to S205.

In S203, the previous estimated alcohol concentration value A1 is subtracted from the current estimated alcohol concentration value A1. The obtained difference is obtained as an alcohol concentration change amount Dn. Here, the alcohol concentration change amount Dn may be computed as the amount of change for a predetermined time or the amount of change for each predetermined fuel consumption amount.

In S204, according to Formulae (1) to (4), the correction amounts of individual cylinder K1 to K4 are computed.

$$K1 = 1 + Z1 \times Dn \quad (1)$$

$$K2 = 1 + Z2 \times Dn \quad (2)$$

$$K3 = 1 + Z3 \times Dn \quad (3)$$

$$K4 = 1 + Z4 \times Dn \quad (4)$$

where Z1 to Z4 are the factors for the respective cylinders, and are preset in the present invention as: Z1=−1.0, Z2=−0.5, Z3=+0.5, and Z4=+1.0.

In S205, it is judged whether or not the currently computed fuel injection amount is a fuel injection amount to be injected to the first cylinder. When the currently computed fuel injection amount is the fuel injection amount to be injected to the first cylinder, the processing proceeds to S206. When the currently computed fuel injection amount is not the fuel injection amount to be injected to the first cylinder, the processing proceeds to S207.

In S206, the correction amount of individual cylinder K1 is input as the variation correction amount Kf to set the correction amount of individual cylinder K1 as the factor for correcting the fuel injection amount.

In S207, it is judged whether or not the currently computed fuel injection amount is a fuel injection amount to be injected to the second cylinder. When the currently computed fuel injection amount is the fuel injection amount to be injected to the second cylinder, the processing proceeds to S208. When the currently computed fuel injection amount is not the fuel injection amount to be injected to the second cylinder, the processing proceeds to S209.

In S208, the correction amount of individual cylinder K2 is input as the variation correction amount Kf to set the correction amount of individual cylinder K2 as the factor for correcting the fuel injection amount.

In S209, it is judged whether or not the currently computed fuel injection amount is a fuel injection amount to be injected to the third cylinder. When the currently computed fuel injection amount is the fuel injection amount to be injected to the third cylinder, the processing proceeds to S210. When the currently computed fuel injection amount is not the fuel injection amount to be injected to the third cylinder, the processing proceeds to S211.

In S210, the correction amount of individual cylinder K3 is input as the variation correction amount Kf to set the correction amount of individual cylinder K3 as the factor for correcting the fuel injection amount.

In S211, it is judged whether or not the currently computed fuel injection amount is a fuel injection amount to be injected to the fourth cylinder. When the currently computed fuel injection amount is the fuel injection amount to be injected to the fourth cylinder, the processing proceeds to S212. When the currently computed fuel injection amount is not the fuel injection amount to be injected to the fourth cylinder, the processing proceeds to S213.

In S212, the correction amount of individual cylinder K4 is input as the variation correction amount Kf to set the correction amount of individual cylinder K4 as the factor for correcting the fuel injection amount.

In S213, the fuel injection amount computed before the execution of the second embodiment, that is, the basic fuel injection amount Tb based on the boost pressure Pb and the engine rpm Ne is multiplied by the variation correction amount Kf to be corrected.

Although the basic fuel injection amount Tb is multiplied by the variation correction amount Kf to be corrected in the present invention, the variation correction amount Kf may be added to the basic fuel injection amount Tb to perform the correction.

Figure 8:
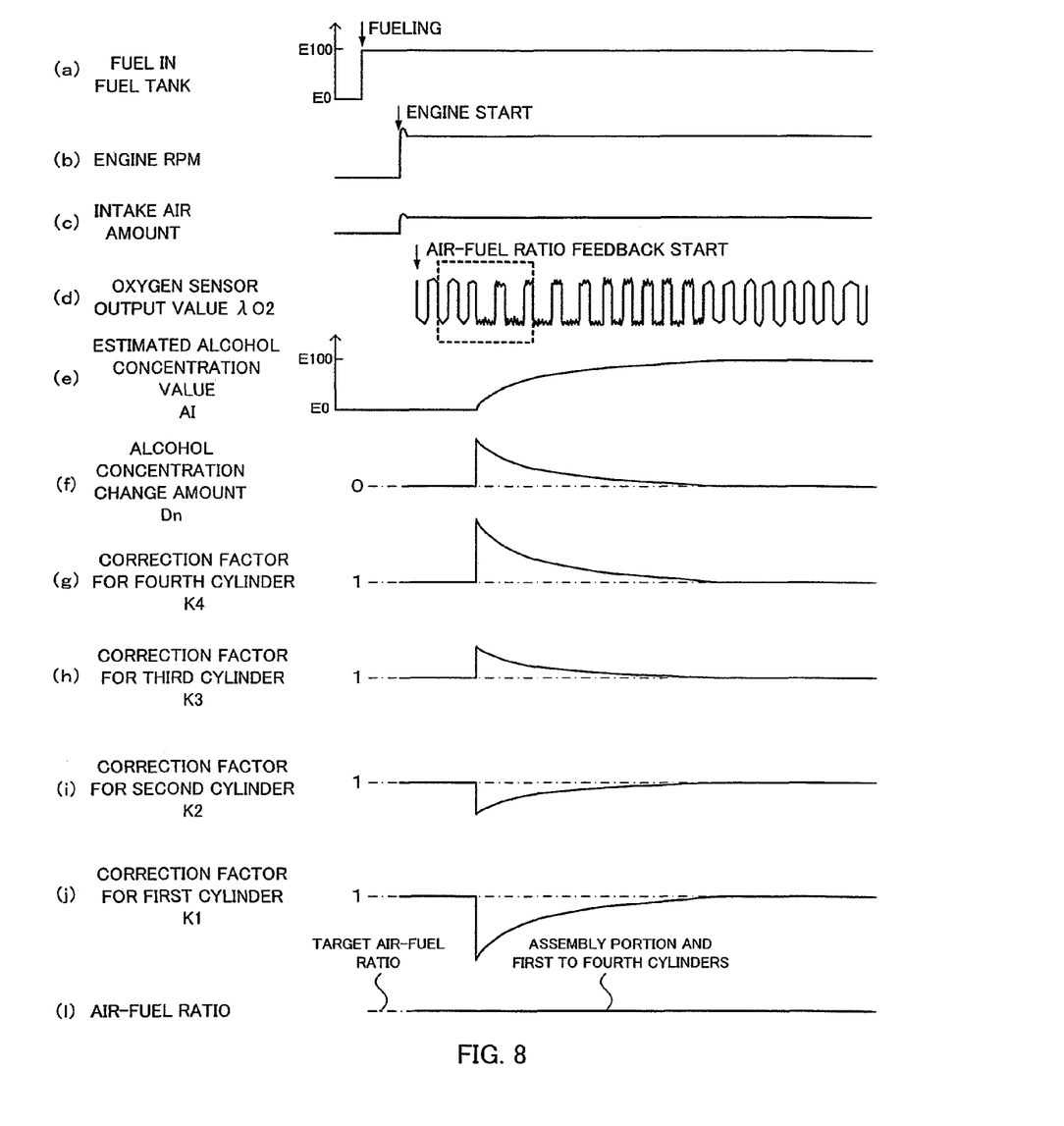
FIG. 8 is a view illustrating a behavior of the internal combustion engine when the fuel is switched from the gasoline to the alcohol fuel in the internal combustion engine according to the second embodiment of the present invention.
Figure 9:
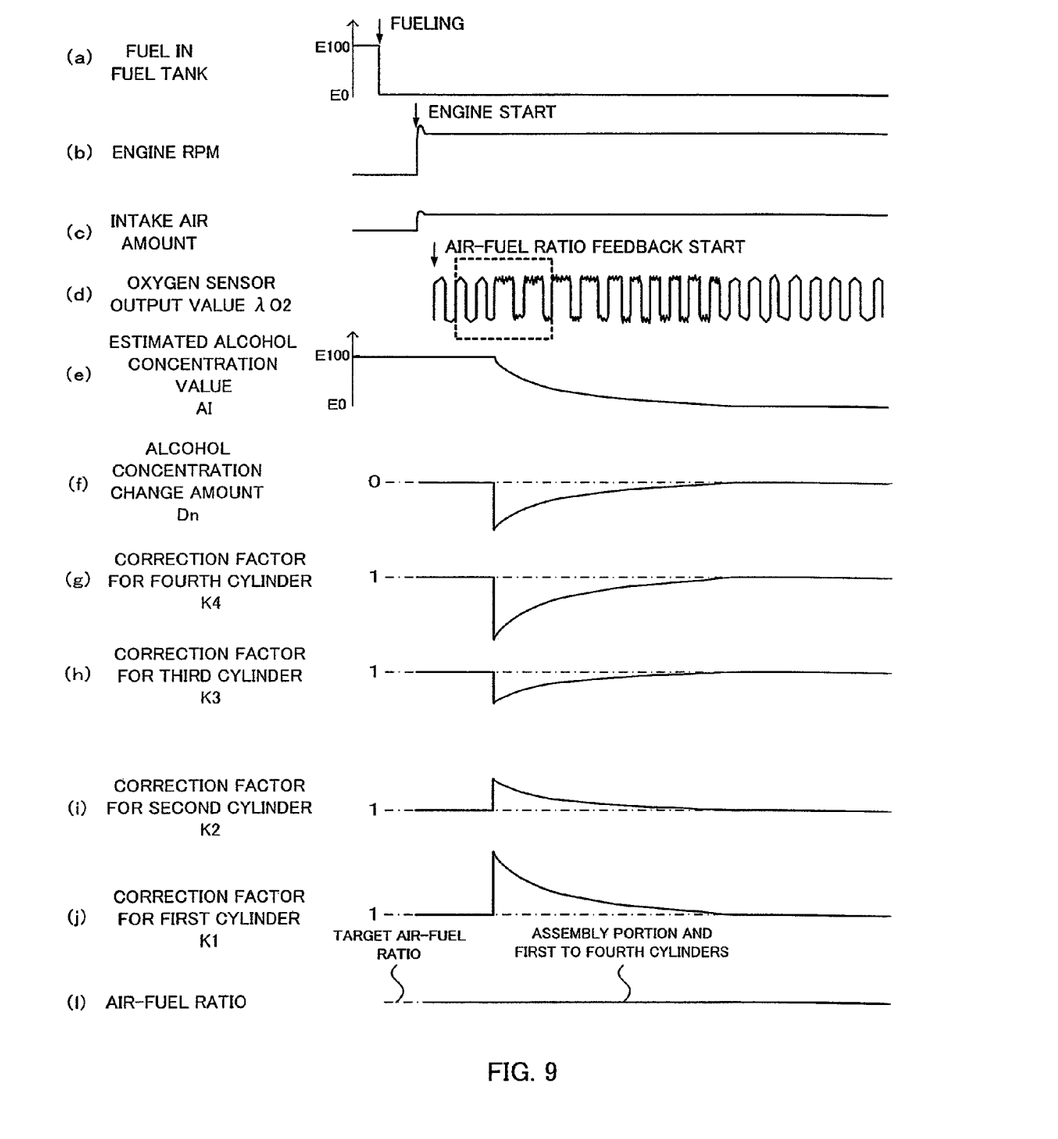
FIG. 9 is a view illustrating the behavior of the internal combustion engine when the fuel is switched from the alcohol fuel to the gasoline in the internal combustion engine according to the second embodiment of the present invention.

Next, an example of implementation of the correction of the fuel injection amount of individual cylinder according to the second embodiment of the present invention is described referring to timing charts of FIGS. 8 and 9.

First, in FIG. 8, the case where the fuel is switched from the gasoline (E0) to the alcohol fuel (E100) is described. Although the gasoline (E0) is stored in the fuel tank 23 until fuel feeding, the alcohol fuel (E100) is fed to the fuel tank 23 by the fuel feeding. As the fuel is consumed, the alcohol fuel (E100) moves in the fuel pipe 21. After reaching the delivery pipe 20, the alcohol fuel is mixed with the gasoline (E0) in the delivery pipe 20 to be supplied to each of the injectors 12a to 12d to be used for the combustion. Therefore, the estimated alcohol concentration value A1 starts changing a little while after the engine start to gradually converge to E100.

Since the amount of change in the alcohol concentration is large immediately after the alcohol fuel (E100) reaches the delivery pipe 20, the alcohol concentration change amount Dn also has a large value. As the estimated alcohol concentration value A1 gets closer to the E100, the alcohol concentration change amount Dn gradually converges to 0. With the convergence, each of the correction amounts of individual cylinder K1 to K4 changes according to the alcohol concentration change amount Dn.

If the correction for each cylinder is not performed as in the case of FIG. 4, the air-fuel ratios of the first and second cylinders are on the rich side, whereas those of the third and fourth cylinders are on the lean side. In order to correct the air-fuel ratios to obtain the target air-fuel ratio, each of the correction amounts of individual cylinder K1 and K2 is set to a value smaller than 1 to correct the fuel injection amount to be smaller, whereas each of the correction amounts of individual cylinder K3 and K4 is set to a value larger than 1 to correct the fuel injection amount to be larger.

The fuel of the fuel injection amounts corrected with the correction amounts of individual cylinder K1 to K4 is injected to allow the air-fuel ratio to be the target air-fuel ratio in the assembly portion and all the first to fourth cylinders.

In FIG. 9, the case where the fuel is switched from the alcohol fuel (E100) to the gasoline (E0) in contrast to FIG. 8 is described. A difference from FIG. 8 lies in that the alcohol concentration change amount Dn is equal to or less than 0 because the alcohol concentration converges from E100 to E0.

If the correction for each cylinder is not performed in this case, the air-fuel ratios of the first and second cylinders are on the lean side, whereas the air-fuel ratios of the third and fourth cylinders are on the rich side in this case. Therefore, in order to correct the air-fuel ratios to obtain the target air-fuel ratio, each of the correction amounts of individual cylinder K1 and K2 is set to a value larger than 1 to correct the fuel injection amount to be larger, whereas each of the correction amounts of individual cylinder K3 and K4 is set to a value smaller than 1 to correct the fuel injection amount to be smaller.

The fuel of the fuel injection amounts corrected with the correction amounts of individual cylinder K1 to K4 is injected to allow the air-fuel ratio to be the target air-fuel ratio in the assembly portion and all the first to fourth cylinders.

In the control apparatus for the internal combustion engine according to the second embodiment of the present invention, when the change in the alcohol concentration is detected, the fuel injection amount is corrected differently for each cylinder according to the alcohol concentration. As a result, the air-fuel ratio variation between the cylinders occurring when the alcohol concentration changes can be absorbed to obtain the target air-fuel ratio, thereby realizing the improvement of a combustion state.

Third Embodiment

In the control apparatus for the internal combustion engine according to a third embodiment of the present invention, the air-fuel ratio variation between the cylinders when the alcohol concentration changes is detected to execute the detection of the alcohol concentration.

Figure 10:
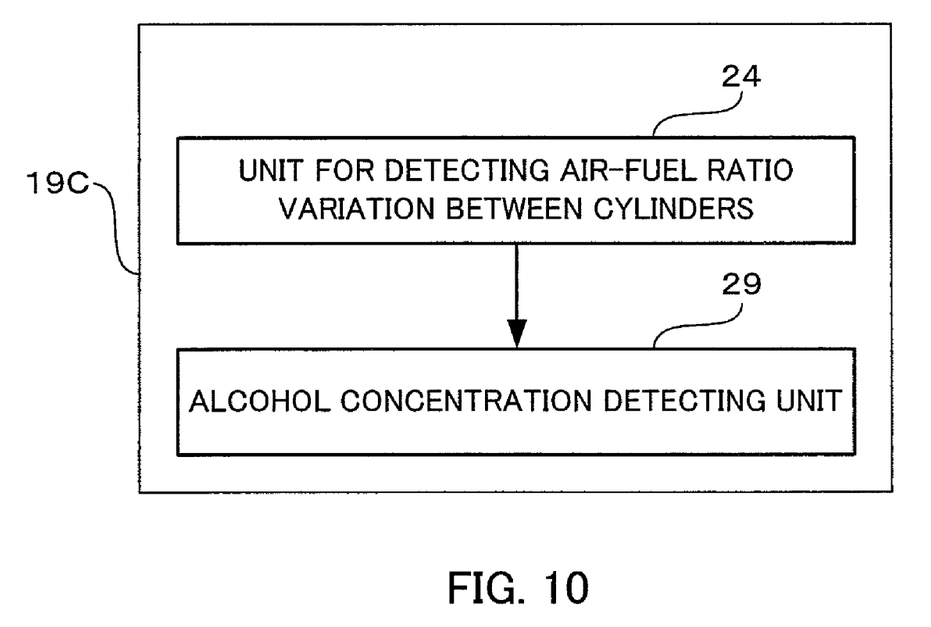
FIG. 10 is a block diagram illustrating functions of a control apparatus for an internal combustion engine according to a third embodiment of the present invention.

FIG. 10 is a block diagram illustrating the functions of the control apparatus for the internal combustion engine according to the third embodiment of the present invention. Since configuration diagrams illustrating the entire system including the control apparatus for the internal combustion engine and the fuel flow path according to the third embodiment of the present invention are the same as the configuration diagrams of FIGS. 2 and 3, the description thereof is herein omitted.

The program is stored in the ROM of an ECU 19C according to the third embodiment of the present invention. The CPU reads out the program stored in the ROM to execute the computation according to the instruction of the program. As a result, an alcohol concentration detecting unit 29 and the unit 24 for detecting the air-fuel ratio variation between the cylinders function in the ECU 19C.

When the air-fuel ratio variation between the cylinders is detected by the unit 24 for detecting the air-fuel ratio variation between the cylinders, the alcohol concentration detecting unit 29 detects an error in the air-fuel ratio based on the oxygen sensor output value $\lambda O2$ output by the oxygen sensor 18 provided in the assembly portion of the exhaust pipes. According to the detected error, the estimated alcohol concentration value A1 is computed.

The unit 24 for detecting the air-fuel ratio variation between the cylinders computes the amount of fluctuation of the oxygen sensor in a combustion stroke cycle of each cylinder from the oxygen sensor output value $\lambda O2$ output by the oxygen sensor 18 provided in the assembly portion of the exhaust pipes as an oxygen sensor fluctuation amount Da, integrates an absolute value of the oxygen sensor fluctuation amount Da during a predetermined stroke number Kc to compute an oxygen sensor fluctuation integrated value $\Sigma Da$, and judges that there is a change in concentration when the oxygen sensor fluctuation integrated value $\Sigma Da$ is larger than a threshold value THLD at the end of the predetermined stroke number Kc to execute the detection of the alcohol concentration.

The predetermined stroke number Kc corresponds to a combustion stroke cycle of each cylinder, and is a preset value. When the accuracy of detection of alcohol concentration change timing is to be improved, a large value is set as the predetermined stroke number Kc. When the alcohol concentration change timing is to be detected in an early stage, a small value is set.

As the threshold value THLD, a value, which is smaller than the oxygen sensor fluctuation integrated value $\Sigma Da$ when the alcohol concentration changes and is larger than the oxygen sensor fluctuation integrated value $\Sigma Da$ when the alcohol concentration does not change, is preset.

Figure 11:
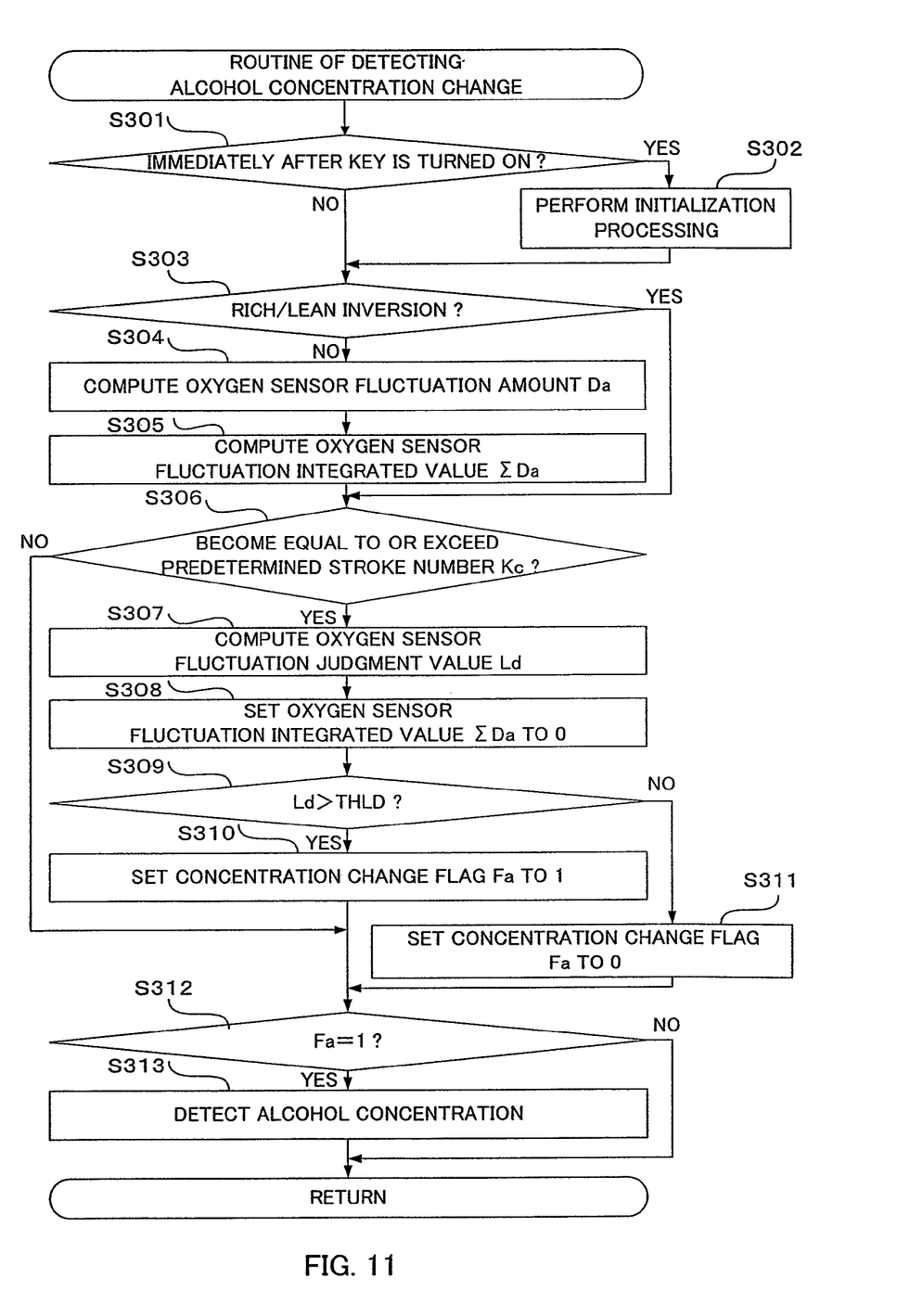
FIG. 11 is a flowchart illustrating a procedure of a routine of detecting an alcohol concentration change, which is executed in an ECU according to the third embodiment of the present invention.

Next, an operation of the detection of the change in the alcohol concentration in the control apparatus for the internal combustion engine according to the third embodiment of the present invention is described referring to a flowchart of FIG. 11. The operation is executed as a sub-routine during the execution of a main routine in a predetermined time cycle in the ECU 19C.

First, in S301, it is determined whether or not a key is immediately after being turned ON. When the key is immediately after being turned ON, the processing proceeds to S302. When the key is not immediately after being turned ON, the processing proceeds to S303.

In S302, initialization processing of each parameter and a flag is performed. Specifically, a concentration change flag Fa is reset to 0, whereas each of an oxygen sensor fluctuation judgment value Ld and the oxygen sensor fluctuation integrated value $\Sigma Da$ is set to 0.

In S303, it is judged whether or not the oxygen sensor output value is inverted from rich to lean or from lean to rich. When the oxygen sensor output value is not inverted, the processing proceeds to S304. When the oxygen sensor output value is inverted, the processing proceeds to S306.

In S304, the oxygen sensor fluctuation amount Da corresponding to the amount of fluctuation between the combustion strokes of each cylinder is computed. The oxygen sensor fluctuation amount Da is an absolute value of a difference between the oxygen sensor output value in the previous combustion stroke and the oxygen sensor output value in the current combustion stroke.

In S305, the oxygen sensor fluctuation amount Da of each cylinder, which is obtained by the computation, is integrated to obtain the oxygen sensor fluctuation integrated value $\Sigma Da$ of each cylinder.

In S306, it is determined whether or not the number of the combustion strokes becomes equal to or exceeds the predetermined stroke number Kc. When the number of the combustion strokes is less than the predetermined stroke number Kc, the processing proceeds to S312. When the number of the combustion strokes is equal to or larger than the predetermined stroke number Kc, the processing proceeds to S307.

In S307, the oxygen sensor fluctuation judgment value Ld is replaced by the oxygen sensor fluctuation integrated value $\Sigma Da$.

In S308, the oxygen sensor fluctuation integrated value $\Sigma Da$ is set to 0.

In S309, it is determined whether or not the oxygen sensor fluctuation judgment value Ld exceeds the preset threshold value THLD. When the oxygen sensor fluctuation judgment value Ld exceeds the preset threshold value THLD, the processing proceeds to S310. When the oxygen sensor fluctuation judgment value Ld is equal to or less than the threshold value THLD, the processing proceeds to S311.

In S310, it is judged that the fluctuation in the oxygen sensor output value $\lambda O2$ is caused by the change in the alcohol concentration to set the concentration change flag Fa to 1.

In S311, it is judged that the fluctuation in the oxygen sensor output value $\lambda O2$ is not caused by the change in the alcohol concentration to set the concentration change flag Fa to 0.

In S312, it is determined whether or not the concentration change flag Fa is set to 1. When the concentration change flag Fa is set to 1, the processing proceeds to S313. When the concentration change flag Fa is set to 0, the processing returns to the main routine.

In S313, after the alcohol concentration detection is executed, the processing returns to the main routine.

Figure 12:
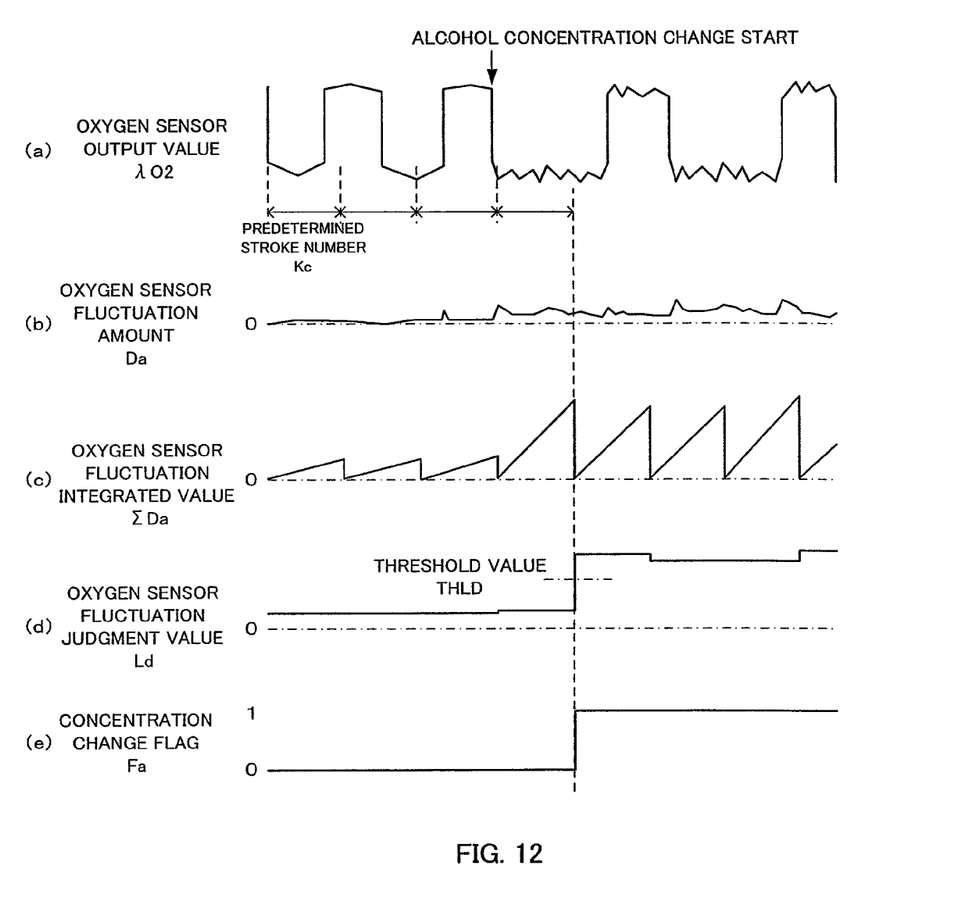
FIG. 12 is a view illustrating a behavior for detecting the air-fuel ratio variation between the cylinders in the ECU according to the third embodiment of the present invention.

Next, an example of implementation of the detection of the change in the alcohol concentration in the control apparatus for the internal combustion engine according to the third embodiment of the present invention is described referring to a timing chart of FIG. 12. FIG. 12 illustrates an area surrounded by dotted lines of FIG. 8 in an enlarged manner.

Before the alcohol concentration starts changing, the fluctuation (radiofrequency component) in the oxygen sensor output value $\lambda O2$ except for the rich/lean inversion is small. Therefore, each of the oxygen sensor fluctuation amount Da corresponding to the absolute value of the difference between the previous and current oxygen sensor output values $\lambda O2$ in the combustion strokes, the oxygen sensor fluctuation integrated value $\Sigma Da$ corresponding to the integrated value of the oxygen sensor fluctuation amount Da, and the oxygen sensor fluctuation judgment value Ld updated for each predetermined stroke number Kc has a small value.

After the alcohol concentration starts changing, however, the fluctuation (radiofrequency component) in the oxygen sensor output value $\lambda O2$ except for the rich/lean inversion becomes large. As a result, each of the oxygen sensor fluctuation amount Da, the oxygen sensor fluctuation integrated value $\Sigma Da$, and the oxygen sensor fluctuation judgment value Ld has a large value.

When the oxygen sensor fluctuation judgment value Ld becomes larger than the threshold value THLD, specifically, after the number of combustion strokes becomes equal to or exceeds the predetermined stroke number Kc for the first time after the fluctuation in the oxygen sensor output value $\lambda O2$ becomes large, it is judged that the alcohol concentration changes. Then, the concentration change flag Fa becomes 1 to execute the detection of the alcohol concentration.

In the control apparatus for the internal combustion engine according to the third embodiment of the present invention, the alcohol concentration is detected when the variation in the air-fuel ratio between the cylinders is detected. As a result, the improvement of the detection accuracy of the alcohol concentration change timing and the reliability can be realized.

Thus, the detection of the change in the alcohol concentration is executed based on the fluctuation in the oxygen sensor output value $\lambda O2$. As a result, the detection accuracy of the alcohol concentration change timing and the reliability can be improved.

Although the alcohol concentration is computed from the oxygen sensor signal in the control apparatus for the internal combustion engine according to the third embodiment of the present invention, the detection of the alcohol concentration is not limited thereto. For example, the alcohol concentration may be detected by using the alcohol concentration sensor provided for the fuel pipe.

What is claimed is:

1. A control apparatus for an internal combustion engine, comprising:
    means for detecting a change in an alcohol concentration of a fuel supplied to the internal combustion engine including a plurality of cylinders;
    means for detecting an air-fuel ratio variation between the plurality of cylinders;
    means for making a failure diagnosis when the air-fuel ratio variation between the plurality of cylinders exceeds a predetermined threshold value; and
    means for inhibiting the failure diagnosis executed based on the air-fuel ratio variation between the plurality of cylinders when the change in the alcohol concentration is detected and the increase of the air-fuel ratio variation is detected by the means for detecting an air-fuel ratio variation.

2. The control apparatus according to claim 1, wherein:
    the means for detecting a change in alcohol concentration detects an alcohol concentration variation when the means for detecting an air-fuel ratio variation between the plurality of cylinders judges that the air-fuel ratio variation between the plurality of cylinders exceeds a predetermined threshold value.

\* \* \* \* \*